(12) United States Patent
Iyer

(10) Patent No.: US 9,962,656 B2
(45) Date of Patent: May 8, 2018

(54) METHOD OF USING NEW SOLVENTS FOR FORWARD OSMOSIS

(71) Applicant: NRGTEK, INC., Orange, CA (US)

(72) Inventor: Subramanian Iyer, Orange, CA (US)

(73) Assignee: NRGTEK, INC., Orange, CA (US)

( * ) Notice: Subject to any disclaimer, the term of this patent is extended or adjusted under 35 U.S.C. 154(b) by 65 days.

(21) Appl. No.: 15/272,406

(22) Filed: Sep. 21, 2016

(65) Prior Publication Data

US 2018/0078901 A1   Mar. 22, 2018

(51) Int. Cl.
　　*C02F 1/44*　　(2006.01)
　　*B01D 61/00*　　(2006.01)
　　*C02F 103/08*　　(2006.01)

(52) U.S. Cl.
　　CPC ......... *B01D 61/005* (2013.01); *B01D 61/002* (2013.01); *C02F 1/44* (2013.01); *C02F 1/445* (2013.01); *C02F 2103/08* (2013.01)

(58) Field of Classification Search
　　CPC .. B01D 61/005; B01D 61/0002; B01D 61/02; C02F 1/445; C02F 1/44; C02F 1/441; C02F 2103/08
　　USPC .................................................. 210/639, 652
　　See application file for complete search history.

(56) References Cited

U.S. PATENT DOCUMENTS

| | | | |
|---|---|---|---|
| 3,403,522 A | 10/1968 | Henry | |
| 4,279,628 A | 7/1981 | Wymer et al. | |
| 4,466,946 A | 8/1984 | Goddin, Jr. et al. | |
| 4,609,384 A | 9/1986 | Ranke et al. | |
| 5,277,884 A | 1/1994 | Shinnar et al. | |
| 6,322,612 B1 | 11/2001 | Sircar et al. | |
| 6,391,205 B1 | 5/2002 | McGinnis | |

(Continued)

FOREIGN PATENT DOCUMENTS

| | | |
|---|---|---|
| EP | 0571997 A1 | 12/1993 |
| EP | 2700440 A2 | 2/2014 |
| WO | 2015068160 A1 | 5/2015 |

OTHER PUBLICATIONS

PCT Form ISA237, Written Opinion, PCT/US2017/044903 (dated Oct. 18, 2017).

(Continued)

*Primary Examiner* — Claire A Norris
*Assistant Examiner* — Julia L. Wun
(74) *Attorney, Agent, or Firm* — Ultimatedge IP Law Group, P.C.; Dean G. Stathakis; Vito A. Canuso, III

(57) ABSTRACT

A method is provided for using forward osmosis to remove impurities dissolved in an aqueous-based feed solution, where the method includes directing a solvent past a first side of a forward osmosis membrane and the feed solution is directed past a second side of the forward osmosis membrane, the solvent having a higher osmotic pressure than the feed solution so as to draw water across the membrane thereby diluting the solvent and concentrating the impurities in the feed solution, where the solvent is an amine-terminated branched PEG, such as amine-terminated glycerol ethoxylate, amine-terminated trimethylolpropane ethoxylate, or amine-terminated pentaerithritol ethoxylate, for example. The method further includes regenerating the solvent by exposing the diluted solvent to a gas containing $CO_2$, whereby the $CO_2$ is absorbed by the solvent, facilitating substantial separation of the solvent from water.

5 Claims, 1 Drawing Sheet

(56) References Cited

U.S. PATENT DOCUMENTS

| | | |
|---|---|---|
| 6,849,184 B1 | 2/2005 | Lampi et al. |
| 7,314,847 B1 | 1/2008 | Siriwardane |
| 7,740,689 B2 | 6/2010 | Fradette et al. |
| 7,955,506 B2 | 6/2011 | Bryan et al. |
| 8,021,549 B2 | 9/2011 | Kirts |
| 8,021,553 B2 | 9/2011 | Iyer |
| 8,083,942 B2 | 12/2011 | Cath et al. |
| 8,133,307 B2 | 3/2012 | Suzuki |
| 8,252,091 B2 | 8/2012 | Anand et al. |
| 8,398,757 B2 | 3/2013 | Iijima et al. |
| 8,551,221 B2 | 10/2013 | Wolfe |
| 8,646,616 B2 * | 2/2014 | Mickols ............ B01D 67/0093 210/490 |
| 8,647,421 B2 | 2/2014 | Yonekawa |
| 8,702,846 B2 | 4/2014 | Menzel |
| 8,852,436 B2 * | 10/2014 | Rajagopalan ...... B01D 11/0446 210/639 |
| 9,216,917 B2 | 12/2015 | Carmignani et al. |
| 2009/0130411 A1 | 5/2009 | Chang et al. |
| 2009/0294366 A1 | 12/2009 | Wright et al. |
| 2010/0303693 A1 | 12/2010 | Leppin |
| 2010/0313752 A1 | 12/2010 | Powell et al. |
| 2011/0186441 A1 | 8/2011 | LaFrancois et al. |
| 2012/0060686 A1 | 3/2012 | Kortunov et al. |
| 2012/0085232 A1 | 4/2012 | Sethna et al. |
| 2012/0171095 A1 | 7/2012 | O'Brian et al. |
| 2012/0211423 A1 | 8/2012 | Kim et al. |
| 2012/0222442 A1 | 9/2012 | Dieckmann et al. |
| 2013/0139695 A1 | 6/2013 | Chang et al. |
| 2013/0305922 A1 | 11/2013 | Matzger et al. |
| 2015/0122727 A1 * | 5/2015 | Karnik ................ B01D 53/22 210/500.21 |
| 2016/0046360 A1 * | 2/2016 | Kim ........................ B63J 4/002 210/652 |

OTHER PUBLICATIONS

USPTO Non-Final Office Action, U.S. Appl. No. 15/271,175 (dated Aug. 10, 2017).

Yang, et al., Efficient SO2 Capture by Amine Functionalized PEG, Phys. Chem. Chem. Phys. 15: 18123-18127 (2013).

Zhu, Lewis-Base Polymers for Modifying Absorption and Desorption Abilities of Silica Supported, Amine Based Solid Carbon Dioxide Capture Materials, M.S. Thesis, University of Missouri-Columbia (Dec. 2014).

* cited by examiner

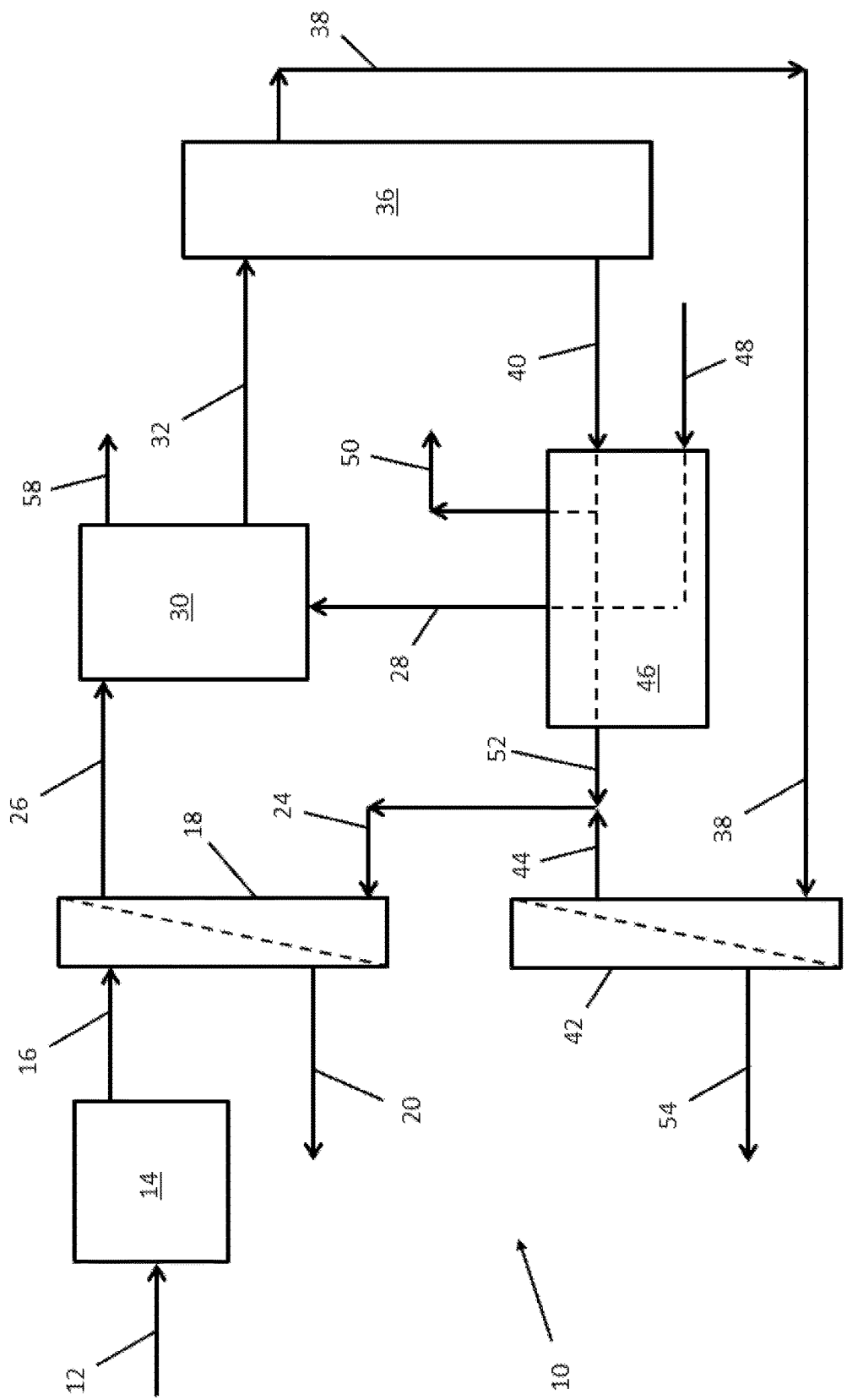

METHOD OF USING NEW SOLVENTS FOR FORWARD OSMOSIS

BACKGROUND

The present invention relates to new solvents for use with forward osmosis processes. Desalination through reverse osmosis is a known technique in the field of water treatment. Generally, reverse osmosis desalination involves artificially adding a relatively high pressure to move water in the opposite direction through a membrane, thereby producing fresh water. Since reverse osmosis requires a relatively high pressure, it also has high energy consumption, typically around 2.0-3.5 kWh/m3 of fresh water produced. Thermal desalination processes are also well-known techniques for both seawater and brackish water treatment, with a typical energy consumption in the range of 14-18 kWh/m3 of fresh water produced, unless free steam is available on site.

Forward osmosis (FO) is a process technology being explored for desalination of seawater, as well as treatment of industrial waste water and other saline waters. Unlike reverse osmosis (RO) processes, which employ high pressures ranging from 400-1100 psi to drive fresh water through the membrane, forward osmosis uses the natural osmotic pressures of salt solutions to effect fresh water separation. A draw solution having a significantly higher osmotic pressure than the saline feed-water flows along the permeate side of the membrane, and water naturally transports itself across the membrane by osmosis. Osmotic driving forces in FO can be significantly greater than hydraulic driving forces in RO, leading to higher water flux rates and recoveries. Thus, it is a non-pressurized system, allowing design with lighter, compact, less expensive materials and low-pressure pumps. These factors translate in savings both in capital and operational costs. Energy represents about 40% of the costs of RO desalination, (and around 80% of the costs of thermal desalination). In addition, the lower amount of more highly concentrated by-product brine is also more easily managed.

As a solute for the osmosis draw solution, ammonium bicarbonate, sulfur dioxide, aliphatic alcohols, aluminum sulfate, glucose, fructose, potassium nitrate, and the like have been used. Among them, an ammonium bicarbonate draw solution is most commonly known, which may be decomposed into ammonia and carbon dioxide and separated at a temperature of about 60° C. after forward osmosis. Furthermore, newly suggested draw solution materials include thermosensitive polymers, magnetic nanoparticles having a hydrophilic peptide attached thereto (separated by a magnetic field), a polymer electrolyte such as a dendrimer (separated by a UF or NF membrane), and the like.

In the case of ammonium bicarbonate, the diluted draw solution needs to be heated to about 60° C. or more so as to vaporize the ammonium carbonate, thus requiring higher energy consumption. Also, since complete removal of ammonia is practically difficult, it is less than desirable to use it as drinking water due to the odor of ammonia. In the case of using magnetic nanoparticles as the active component of the draw solution, it is relatively difficult to redisperse magnetic particles that are separated and agglomerated by a magnetic field. It is also relatively difficult to completely remove the nanoparticles, and thus the toxicity of the nanoparticles should be considered. In the case of a draw solution made from a polymer electrolyte, polymer ion (dendrimer, protein, etc.) technology requires a nanofiltration or ultrafiltration membrane filter due to the RH size of the polymer of several to dozens of tens of nanometers. It is also relatively difficult to redisperse the agglomerated polymer after filtering.

Thermosensitive polymeric solutions have been considered as suitable osmotic draw solutes. These polymers have a tendency for phase separation from their water solutions at a critical temperature, and thus can be suitably separated from the permeated water of the FO process. Both lower and upper critical temperatures have been exhibited, depending on the configuration of the polymer molecule. At the lower critical temperature, the polymer separates into a hydrophobic layer from the water, and thus, can be re-concentrated by nanofiltration or other techniques for recycling as a concentrated draw solute for the next cycle of FO. Some polymers can re-dissolve in water above the upper critical temperature.

Polyethylene glycols (PEGs), polymers of ethylene glycol (EG), have been used in industry to produce very high osmotic pressures, in the order of tens of atmospheres. In comparison, seawater (3.5% NaCl) has an osmotic pressure of 28 atms at 25° C. PEGs are hypotonic by nature, and absorb water exceedingly well. The hydrogen bonding between water molecules and the electron-rich ether oxygen in the EO (ethylene oxide) monomer enables almost 2.5-3.0 molecules of water to be coordinated with each EO monomer, leading to high osmotic pressures. Thus, the greater the number of EO monomers in the PEG molecule, the greater the osmotic pressure exhibited. One issue with longer chain-length PEGs is the higher viscosity and higher melting points, as the chain length increases. PEG 200 (EO=4), PEG 300 (EO=6-7) and PEG 400 (EO=9) are all liquid at room temperatures, whereas PEG 600 (EO=12-13) is a waxy solid at room temperature, as are the higher molecular weight PEGs. Thus, a practical limit in the PEG chain length prevents use of longer chain-length PEGs for water absorption.

If an hydrophobic entity, like propanediols or butanediols, is attached to the PEG molecule, the hydrophobic-lipophilic balance (HLB) of the copolymer can be suitably shifted, such that phase separation can occur at certain temperatures, usually termed cloud-point or critical temperatures, as mentioned in the paragraph above. The draw solute copolymers consist of various numbers and orders of diols, which impart the required solution properties. Osmotic pressure, cloud point temperature, molecular weight and molecular structure are adjusted by adding or subtracting the various monomer units. Within the constraints of osmotic pressure and cloud point temperature, the chemistry of the draw solute polymers can be selected to control the molecular weight and/or physical structure of the polymer resulting in high (>90% and preferably >99%) rejection of the draw solute through filtration. Further, the chemistry of the draw solute polymers can be selected to minimize back diffusion of the solute through the forward osmosis membrane. Preferably, for salt water desalination, the osmotic pressure of a draw solution containing 40% draw solute copolymer in water needs to be greater than 30 atm, preferably greater than 40 atm, and more preferably greater than 50 atm for high water recovery from the saline feed solution, while the molecular weight of the draw solute copolymer is greater than 500, preferably greater than 1000 and more preferably greater than 2000.

While the PEGs used in these copolymers are linear in structure, and increase in melting point and viscosity as the chain-length increases, there are other forms of PEGs available, with different geometries, that are termed branched or multi-armed PEGs. Branched PEGs have 3-10 PEG chains emanating from a central core group. Star PEGS have 10 to 100 PEG chains emanating from a central core group, while comb PEGs have multiple PEG chains grafted onto a polymer backbone. Such branched PEGs allow more EO groups in the polymer, while remaining in the liquid state and having lower melting points and viscosity than comparable linear PEGs with the same number of EO monomers. Thus, the use of such PEG geometries can enable higher water absorption, while retaining the practicality of using higher number of EO monomers for water molecule interaction by hydrogen bonding.

SUMMARY

Embodiments of the present invention include a method using forward osmosis for removing impurities dissolved in an aqueous-based feed solution, where one method comprises directing a solvent past a first side of a forward osmosis membrane while the feed solution is directed past a second side of the forward osmosis membrane, the solvent having a higher osmotic pressure than the feed solution so as to draw water across the membrane thereby diluting the solvent and concentrating the impurities in the feed solution, the solvent comprising an amine-terminated branched PEG. In one embodiment, the solvent comprises amine-terminated glycerol ethoxylate. In another embodiment, the solvent comprises amine-terminated trimethylolpropane ethoxylate. In yet others, the solvent comprises amine-terminated pentaerythritol ethoxylate. Indeed, other amine-terminated branched PEGs for use as solvents are contemplated by the invention herein. In some applications, methods comprise regenerating the solvent by exposing the diluted solvent to a gas containing $CO_2$, whereby the $CO_2$ is absorbed by the solvent, facilitating substantial separation of the solvent from water.

BRIEF DESCRIPTION OF THE FIGURES

The aforementioned objects and advantages of the present invention, as well as additional objects and advantages thereof, will be more fully understood hereinafter as a result of a detailed description of a preferred embodiment when taken in conjunction with the following drawings in which:

FIG. 1 shows a schematic of one embodiment of the present invention.

DETAILED DESCRIPTION OF CERTAIN EMBODIMENTS

Branched PEGs can be synthesized from glycerol (3 arms), trimethylolpropane (4 arms, though one of the arms has a methyl group), pentaerythriol (4 arms) and other organic compounds. Some simple branched PEGs commercially available are glycerol ethoxylates (GE), trimethylolpropane ethoxylates (TMPE) and pentaerythriol ethoxylates (PEE) of various molecular weights, based on the number of EO monomers in the polymer. Glycerol ethoxylate, with a molecular weight of 1000, has approximately 20 EO groups, but is a liquid at room temperature, and less viscous than PEG 300 (EO=6). Trimethylolpropane ethoxylate, with a MW of 1014, also has 20 EO groups, is liquid at room temperatures, and also less viscous than PEG 300. Other liquid branched ethoxylates include pentaerythriol ethoxylate, MW 270 (EO=3) and pentaerythriol ethoxylate, MW 797 (EO=15). All of these ethoxylates have terminal [—OH] groups, except for the TMP ethoxylates, which have one terminal methyl group replacing one [—OH] group, out of the four available. Branched PEGs also have advantageous properties of steric hindrance, exhibit lower viscosity than comparable linear PEGs, have lower melting points, and, thus, enable better absorption of water in the FO process.

All of these branched PEGs exhibited very high osmotic pressures, around 200-300 atms, and are very suitable as osmotic draw solutes. Further discussion of such branched PEGS, and applications thereof, can be found in co-pending U.S. Ser. No. 15/271,175, filed on Sep. 20, 2016, incorporated herein in its entirety by reference. Given the propensity for $CO_2$ absorption of the EO monomers in the physical solvents described above, as well as the superior absorption characteristics of amine-based solvents for $CO_2$ and $H_2S$, a new class of solvents, based on aminated branched polyethylene glycols, is postulated therein. The synthesis of such amine-terminated branched ethoxylates is fairly straightforward. One methodology used is as follows: glycerol ethoxylate is reacted with diethylene triamine (DETA) in the presence of acid catalyst at 95°–100° C. in an inert atmosphere. The DETA quantity can be varied depending on requirements, with the maximum amount being 3.3 moles to 1 mole of glycerol ethoxylate. Other amines can be used, instead of DETA. DETA is preferred as this gives greater stability to the amine functionality. Amine-terminated glycerol ethoxylate, trimethylolpropane ethoxylate and pentaerythritol ethoxylate were synthesized.

An additional physical phenomenon was discovered during the absorption of $CO_2$ by aqueous solutions of these amine-terminated branched polymers. Before the absorption of carbon dioxide gas was performed, these polymers were completely soluble in water. However, after absorption of $CO_2$, the aqueous polymer solution formed a two-phase mixture, clearly separated from each other—an amine-rich phase and a water-rich phase, in roughly the same proportions used for the original water-polymer mixtures. Both the amine-terminated glycerol ethoxylate and the amine-terminated pentaerythritol ethoxylate exhibited the same phenomena for complete water solubility before $CO_2$ absorption and complete insolubility with water after $CO_2$ absorption.

An important feature of the inventive solvents contemplated herein is their capacity to exhibit very high osmotic pressures. Thus, they can absorb large amounts of water, and can be used effectively as a draw solution in a forward osmosis system. Osmotic pressure tests were performed over 24 hours, by balancing various concentrations of the synthesized chemicals against varying concentrations of $MgCl_2$ solutions, separated in a U-tube fixture by a HTI CTA FO (cellulose triacetate forward osmosis) semi-permeable membrane. An aqueous solution of 95% w/w of all these chemicals exhibited an osmotic potential of greater that 150 atms at 25° C., and drew water from both 20% and 18% $MgCl_2$ solutions.

The above phenomena of phase separation from water after gas absorption has important implications for practical use of these chemicals in both seawater desalination and $CO_2$ absorption, and major advantages in energy consumption for regeneration of these solvents. Since the amine-terminated branched polymers phase separate from water after gas absorption, the water-rich portion can be removed by filtration, and only the polymer-rich portion needs to be heated up to desorb the absorbed acid gas. Typical temperatures for desorption of $CO_2$ from these amine-terminated branched PEGs is around 60° C., thus efficiently regenerating the polymers for use in the next cycle of forward osmosis.

Osmotic pressures were computed for several synthesized amine-terminated branched ethoxylates against various concentrations of $MgCl_2$ solutions. The results are shown in Table 1 below.

TABLE 1

Observed osmotic pressures of various synthesized chemicals

| | Chemical name | | | |
|---|---|---|---|---|
| | GE1000-3NH$_2$, Glycerol ethoxylate, amine-terminated | GE1200-3NH$_2$, Glycerol ethoxylate, amine-terminated | TMP470-3NH$_2$, Trimethylolpropane amine-terminated | PET797-4NH$_2$, pentaerythritol, amine-terminated |
| Osmotic pressure of 95% aqueous solution | 270 atms | 285 atms | 175 atms | 245 atms |

The high osmotic pressures exhibited by the synthesized amine-terminated branched ethoxylates can be advantageously used as FO draw solutes, and the additional property of high $CO_2$ absorption (and phase separation from water on $CO_2$ absorption) can be used for both water treatment and flue gas treatment at power generation facilities, especially coal-fired power-plants and steam-assisted power generation, as well as in chemical plants where treated water is needed, along with $CO_2$ removal from process gas streams. An example of a process flow diagram, utilizing both forward osmosis and $CO_2$ sequestration, is shown in FIG. 1, described further below.

Referring to embodiment 10 of FIG. 1, for example, fluid 12 containing a relatively high amount of salts, such as raw seawater or saline water needed for steam generation or cooling purposes for power-plants, is pretreated by either flocculation or ultra-filtration 14 to remove suspended solids and organic material. The pretreated water 16 is now sent to a forward Osmosis (FO) system 18, wherein pure water permeates through a semi-permeable membrane in the FO system, due to the large difference in osmotic pressure of the incoming water (typically 15-30 atms), as compared to the high osmotic pressure (around 150-275 atms) of a draw solution on the other side of the semi-permeable membrane in the FO system. The retentate from the FO system 20 is a hypersaline solution of salts and other dissolved materials in water, and can be sent to a salt farm for recovery of salt, or disposed of accordingly in an environmentally acceptable manner. The draw solution 24 can be one of many known draw solutions, including those described in U.S. Pat. No. 8,021,553 to Iyer, which is incorporated in its entirety herein by reference. Embodiments of the present invention, however, comprise preferably a 95% solution of amine-terminated branched ethoxylate polymers in water, which exhibit very high osmotic pressures.

The concentrated draw solution 24 enters as the feed to the FO system 18, and due to extraction of the water from the raw/saline water 16, exits as a diluted draw solution 26 from the FO system. The diluted draw solution is now exposed to a flue gas stream 28 containing $CO_2$ as a major constituent in a gas-liquid mixer 30. The absorption of $CO_2$ by the amine-terminated branched ethoxylate polymers in the diluted solution causes phase separation of the polymer from water, enabling separation of the polymer, in a concentrated form, from its water mixture in a downstream liquid-liquid separator. The mixed amine-terminated branched ethoxylate polymers with absorbed $CO_2$ is sent to the liquid-liquid separator 36 where a water-rich mixture 38 is separated from the concentrated amine-terminated branched ethoxylate polymers with absorbed $CO_2$ 40. The water rich mixture presumably contains some small amount of solvent, so is preferably directed to a reverse osmosis or nano-filtration module 42 to separate the water from any remaining solvent 44, which is then directed as concentrated solvent 24 to the FO module 18.

At the same time, concentrated amine-terminated branched ethoxylate polymers with absorbed $CO_2$ 40 is sent to a heat exchanger 46, wherein hot flue gas 48 transfers heat to the incoming polymeric solution, thereby desorbing/liberating $CO_2$ from the polymer. The desorbed $CO_2$ 50 liberated from the amine-terminated branched ethoxylate polymers can be collected or sequestered for various industrial applications. The regenerated (now $CO_2$-free) concentrated polymer 52 is then used for the next cycle of water purification in the FO system 18 and further absorption of $CO_2$ from flue gas exhaust. The fresh water 54 generated from the system 10 can be used for steam generation or for industrial cooling needs at the power-plant facility. The cleaned flue gas 58, now substantially free of carbon dioxide, can be vented from the mixer 30 to the atmosphere in an environmentally friendly manner.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A method using forward osmosis for removing impurities dissolved in an aqueous-based feed solution, the method comprising directing a solvent past a first side of a forward osmosis membrane while the feed solution is directed past a second side of the forward osmosis membrane, the solvent having a higher osmotic pressure than the feed solution so as to draw water across the membrane thereby diluting the solvent, the solvent comprising an amine-terminated branched PEG.

2. The method of claim 1, wherein the solvent comprises amine-terminated glycerol ethoxylate.

3. The method of claim 1, wherein the solvent comprises amine-terminated trimethylolpropane ethoxylate.

4. The method of claim 1, wherein the solvent comprises amine-terminated pentaerythritol ethoxylate.

5. The method of claim 1, further comprising regenerating the solvent by exposing the diluted solvent to a gas containing $CO_2$, whereby the $CO_2$ is absorbed by the solvent, facilitating substantial separation of the solvent from water.

* * * * *